March 21, 1961 E. H. RAND 2,976,199
PROCESS FOR MANUFACTURE OF BABY PANTS
Filed May 8, 1959 4 Sheets-Sheet 1

INVENTOR
Edward H. Rand
BY Karl W. Flocks
ATTORNEY

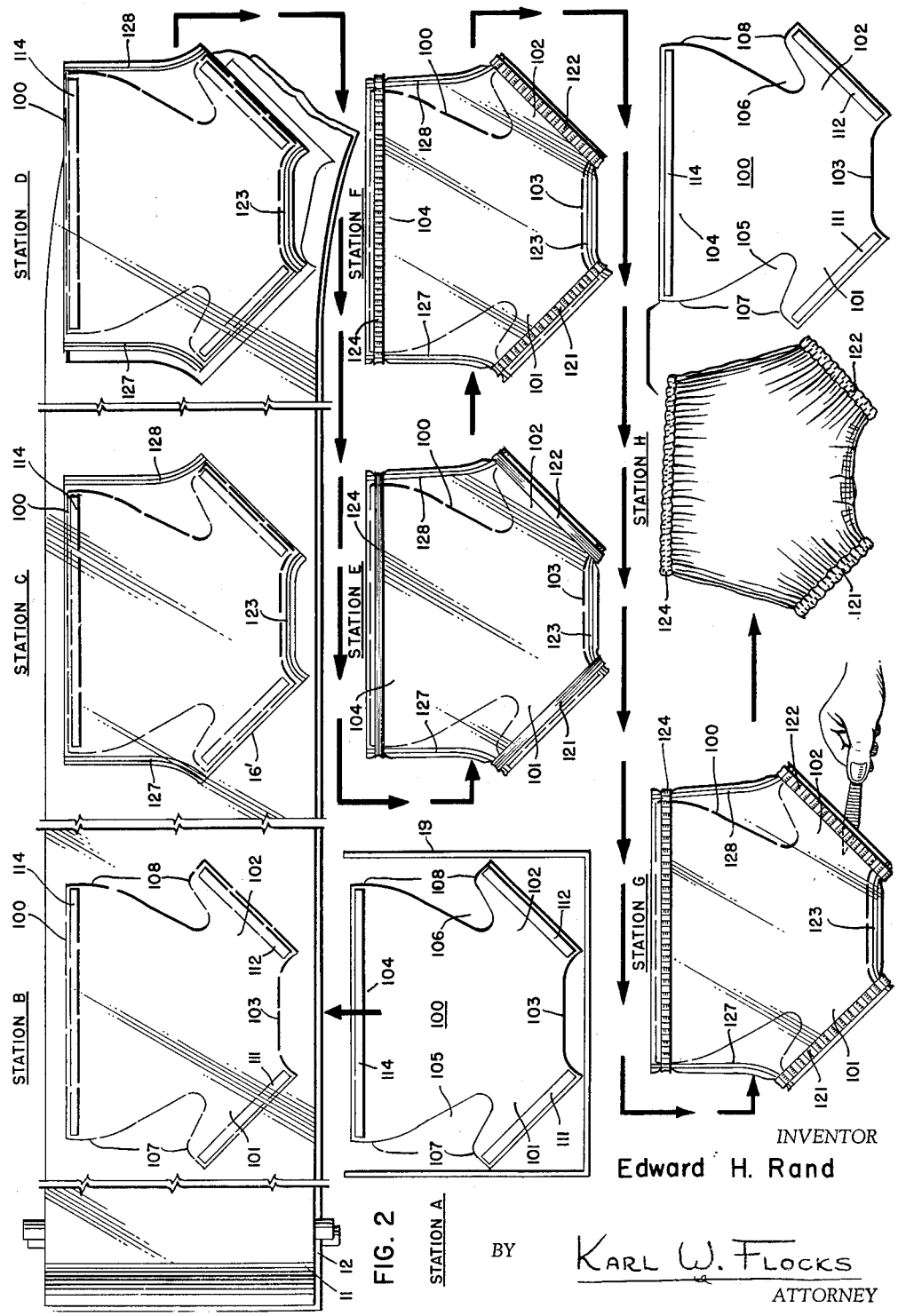

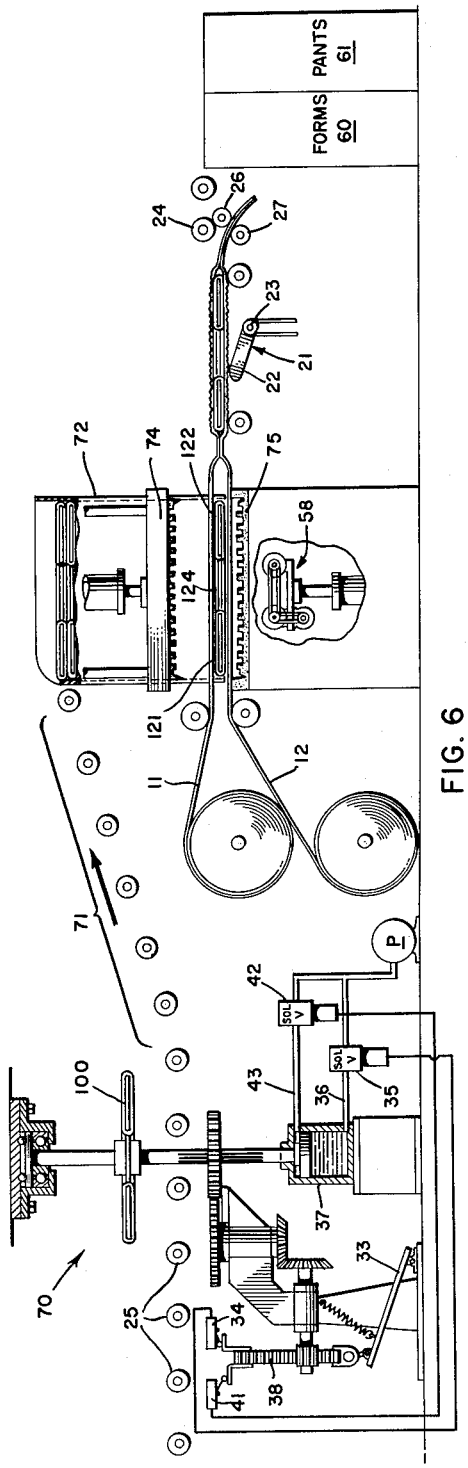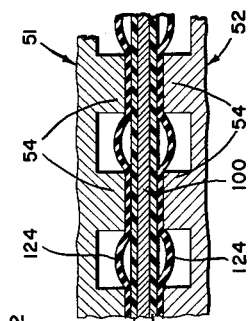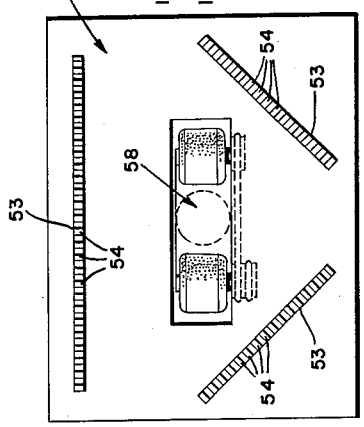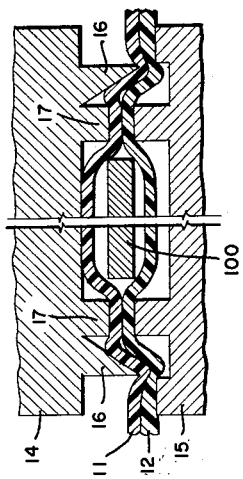

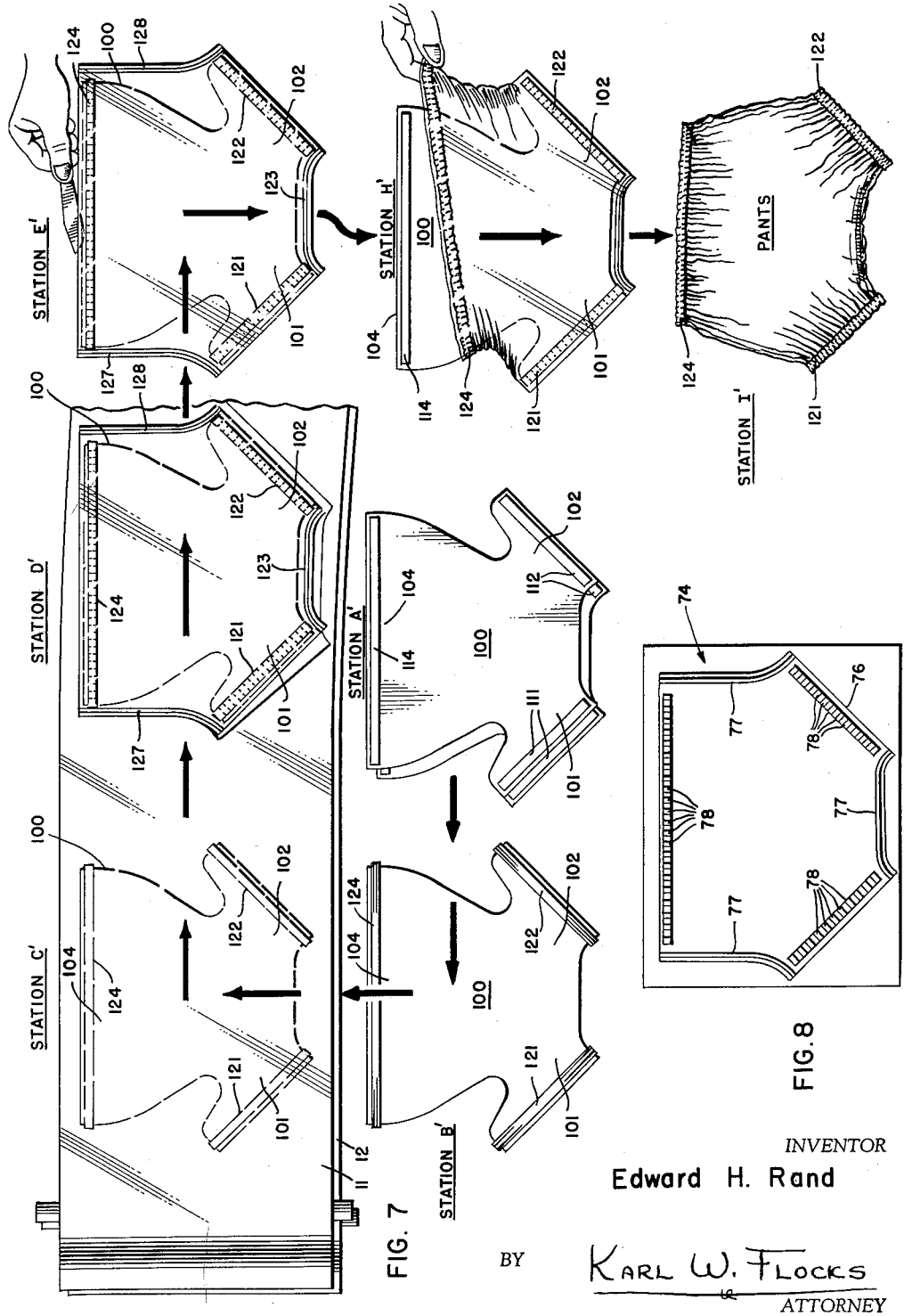

United States Patent Office 2,976,199
Patented Mar. 21, 1961

2,976,199

PROCESS FOR MANUFACTURE OF BABY PANTS

Edward H. Rand, New York, N.Y., assignor to Rand Rubber Co., Inc., Brooklyn, N.Y., a corporation of New York Filed May 8, 1959, Ser. No. 811,850

16 Claims. (Cl. 154—85)

The present invention relates to a process for the manufacture of baby pants, and more particularly to such a process in which heat sealing and cutting steps are employed in a novel manner to produce baby pants from two sheets of thermoplastic material and endless, thermoplastic, elastic bands.

Baby pants, and similar articles, are commonly made by uniting two sheets of material at desired places to provide for heat sealed seams, the material being a thermoplastic such as a vinyl, and the equipment involving so-called electronic sewing machines. In addition to providing the necessary heat sealed or welded seams, an elastic gathering has also been added, particularly in the case of baby pants, to provide for elastic leg and waist openings.

Heretofore, much of the manufacturing was done by hand, utilizing a minimum amount of equipment, and very little automatic equipment.

An object of the present invention is to provide a process for manufacturing baby pants and similar articles.

Another object of the present invention is the provision of a process for manufacturing baby pants which may be accomplished expeditiously and with a minimum amount of labor.

A still further object of the present invention is to provide a process for the manufacture of baby pants and the like that will be extremely economical.

Other objects and the nature and advantages of the present invention will be apparent from the following description taken in conjunction with the accompanying drawings, wherein:

Fig. 2 is a diagrammatic illustration of the steps of the process of the present invention.

Fig. 3 is a cross-sectional detailed view showing the heat cutting and sealing steps in the inventive process.

Fig. 4 is a plan view of an endless band sealing form that may be used with the inventive process.

Fig. 5 is an elevational view showing the use of the form of Fig. 4.

Fig. 6 is a view similar to Fig. 1 showing equipment for carrying out another embodiment of the process of the present invention.

Fig. 7 is a schematic showing of the second embodiment of the process of the present invention.

Fig. 8 is a plan view of a die used in the process of Fig. 7.

Figure 1:
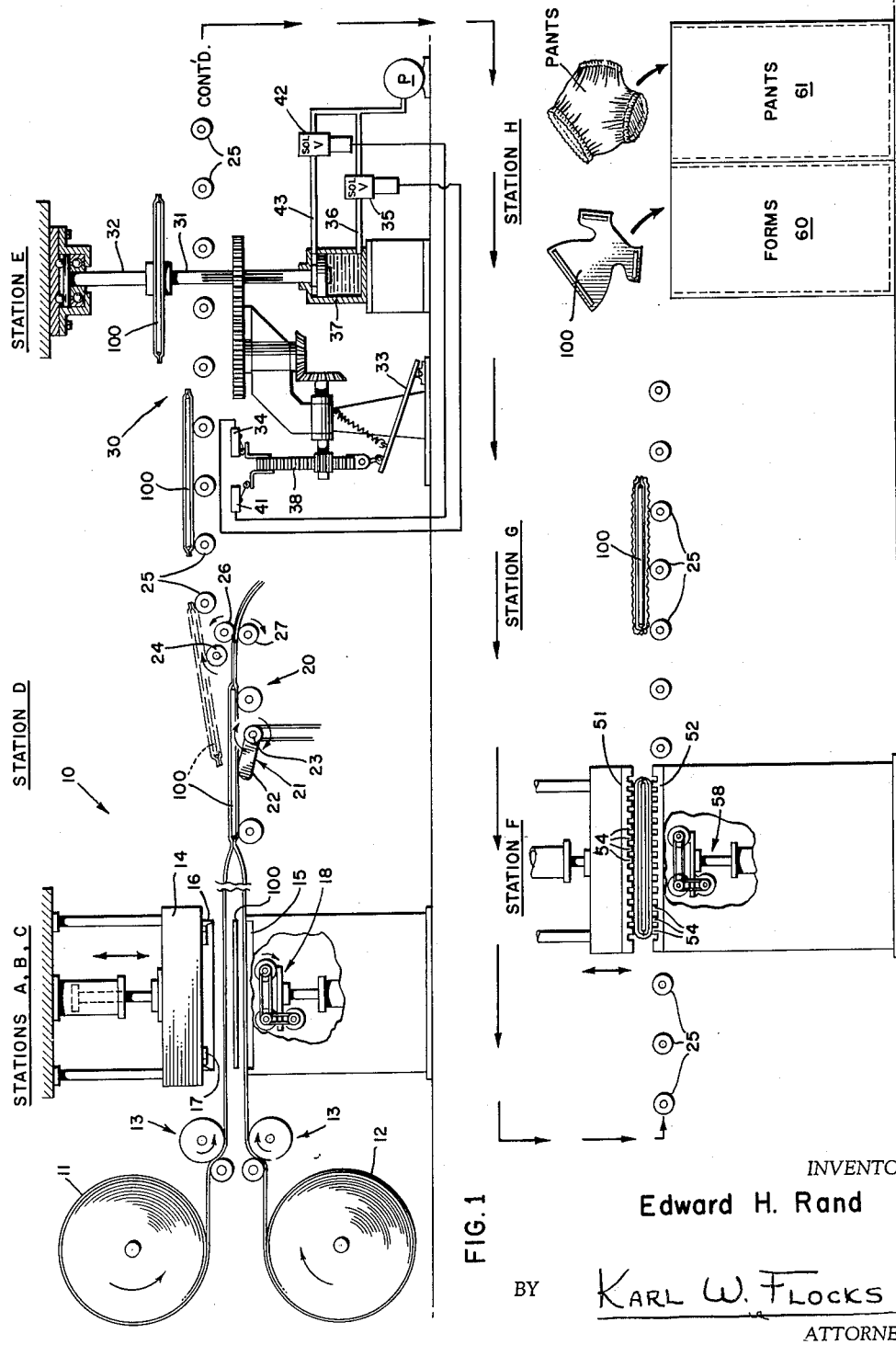
Fig. 1 is a schematic view of equipment for manufacturing baby pants in accordance with the process of the present invention.

Referring now to the drawings, wherein like reference characters are used to designate like or corresponding parts throughout the several views, there is shown in Fig. 1 an apparatus 10 which may conveniently be used for carrying out the process of the present invention. The apparatus 10 comprises a pair of supply rolls 11 and 12 of suitable thermoplastic sheet material, such as a vinyl. For the manufacture of baby pants vinyl material is preferred because of its waterproof characteristics. The material is drawn from the rolls 11 and 12 as sheets of considerable length, and are fed by the feed and guide rolls generally designated 13 in spaced superposed and parallel relationship between the movable die 14 and the jig 15 therebelow.

Beside the die and jig assembly 14, 15, and as may best be seen in Fig. 2, there is provided a magazine and dispenser 19 which holds and dispenses forms 100. The magazine and dispenser 20 may be of any known or desired construction for holding the planar forms 100 in stacked array and for removing the forms 100 from the top or bottom of the stacks as may be desired and feeding each such form, one at a time, into the space between the sheets 11 and 12 and above the jig 15.

The form 100, which is shown in Fig. 2, is particularly adapted for the manufacture of baby pants, and comprises leg parts 101 and 102, a crotch part 103, a waist part 104 and two recesses 105 and 106 that are provided in the side seam parts 107 and 108, respectively. Covering the leg parts 101 and 102 and the waist part 104 are Bakelite or similar strips 111, 112 and 114. It will be understood that the opposite side of the form 100 also has similar strips 111, 112 and 114 thereon, and similarly placed. The edges of the form 100 at the parts 101, 102 and 104 may be sharpened to form a knife edge, for purposes to be hereinafter disclosed.

The above described forms are fed, as have been noted, one at a time by the dispensing mechanism of the magazine and dispenser 19 into the space between the sheets 11 and 12, and above the jig 15. Since the form 100 is made of a metallic, conductive material, such as aluminum, it will descend into the jig 15, carrying with it the bottom sheet 12, and will come to rest in the jig 15 in a predetermined position. Sufficient slack will be provided in both the sheets 11 and 12 to permit them to substantially contact each other in the jig 15 about the periphery of form 100 and to permit the form 100 to be in contact with both the sheets 11 and 12. Thereafter, the die 14, shown in Fig. 1, will descend into engagement with the top sheet 11.

As may be seen from Fig. 3, die 14 is provided with a cutting edge 16 that extends about the periphery of the form 100 and is also provided with sealing bars 17 properly positioned to provide a sealed seam adjacent the side seam parts 107 and 108 and the crotch part 103 of the form 100.

Referring to Fig. 2, the magazine and dispenser 19 is located at the station designated A, and the form 100 when initially inserted between the sheets 11 and 12 is indicated at station B. After the die 14 has descended and heat cutting and sealing has occurred, by known electronic apparatus, the die 14 is withdrawn upwardly so that the configuration shown at station C is obtained. At station C it will be seen that the exterior line 16' has been made in the two sheets 11 and 12. It will be understood that the line 16' is actually a tear seam of very low strength and thickness that is provided between the sheets 11 and 12. Interiorly of the line 16' there may be seen side seams 127 and 128 as well as a crotch seam 123. These latter seams are of substantial width, and consequently of substantial strength, since they are areas in which the two sheets 11 and 12 have been fused to each other. As will be understood, the form 100 is within the completely sealed envelope that is formed by the line or tear seal 16', and is in the general form of a baby pants.

After the partial formation of the baby pants, as shown at station C in Fig. 2, the die 14 is caused to rise and thereafter the ejector 18 is also caused to rise. Ejector 18 has powered rollers at the upper end thereof. The ejector 18 moves upwardly through a hole in the central part of jig 15 to engage the bottom sheet 12, and lift the entire partially formed baby pants assembly, including the form 100 therein. Thereafter material is unwound from the supply rolls and the partially completed baby pants is advanced to station D which is represented by the apparatus generally designated 20 in Fig. 1.

The apparatus 20 at station D serves to separate the partially completed baby pants defined by the tear line 16' from the residual material of sheets 11 and 12. The apparatus 20 comprises a kicker 21 which may be in the form of a finger 22 mounted to rotate with a shaft 23. As shaft 23 revolves the finger 22 of kicker 21 will stroke the underside of sheet 12, and form 100 thereabove, and will lift the leading edge of the partially completed baby pants upwardly and impart to it a forward movement. The leading edge of the partially completed baby pants will engage with a clockwise rotating roller 24, and will be fed upwardly onto the powered roller conveyor 25. At the same time, the residual sheeting 11 and 12 will be drawn downwardly through the rollers 26 and 27, it being noted that roller 26 rotates counterclockwise and that roller 27 rotates in a clockwise manner.

The partially completed baby pants, shown being separated from the residual sheeting at station D in Fig. 2, is moved by roller conveyor 25 to the right until it arrives at the apparatus 30 which corresponds to station E of Fig. 2. The apparatus 30 permits the ready application of stretched, endless, elastic thermoplastic bands 121, 122 and 124 over the leg parts 101 and 102 and the waist part 104 of the partially completed baby pants. It will be understood that the endless bands are each placed on the exterior of the two sheets that have been severed from the sheets 11 and 12, and are held in the stretched condition by the form 100.

The apparatus 30 at station E serves to raise the partially completed baby pants, with the form 100 therein, from the conveyor 25 and hold it by its mid area and rotate it so that the bands 121, 122 and 124 may be readily applied. The apparatus 30 comprises an axially and rotatably movable plunger 31 suitably shaped to pass between two of the rollers of the conveyor 25. Above the plunger 31 is an abutment 32 which is rotatable about its axis, but which is otherwise immovable, except for adjustment purposes. The operator may press on a foot pedal 33, the initial movement of which will close a microswitch 34 that is electrically connected to the solenoid of a solenoid operated valve 35 in a hydraulic line 36 that leads to the cylinder 37. Thus, the closing of microswitch 34 will effect the raising of the plunger 31 which is connected to a piston in the cylinder 37. The pedal 33 has a rack 38 connected therewith, and upon depressing of the padel 33 the rack 38 causes the rotation of suitable shafts and gearing so as to translate the rack 38 which is in driving relationship to gear 39 on the plunger 31. Hence, upon initial movement of the pedal 33, the plunger 31 will be raised and will lift the partially completed baby pants into engagement with the abutment 32. Thereafter, further movement of pedal 33 will cause plunger 31, the partially completed baby pants and abutment 32 to rotate, under the control of the operator, so that the endless bands 121, 122 and 124 may be placed at the positions aforementioned on the partially completed baby pants. Upon release of pedal 33, it will move in a counterclockwise direction, to thus rotate the baby pants, with the endless bands now in position on it, back into the initial position thereof and at the end of its travel the pedal 33 will engage with a second microswitch 41 to complete a circuit to the solenoid of a solenoid operated valve 42 in a hydraulic line 43 leading to the other side of the piston in cylinder 37. This will cause plunger 31 to lower and to permit the partially completed baby pants to be deposited upon the conveyor 25 which will then move the baby pants to the right, as shown in Fig. 1, to the next station.

The placement of the stretched bands on the form 100 is facilitated due to the fact that form 100 is in the completely sealed envelope comprising the parts of the sheets 11 and 12. Thus, there is no chance of the bands slipping when being placed on the form.

At the next station, station F of Fig. 2, the apparatus generally designated 50 is used to seal the endless bands 121, 122 and 124 in an intermittent fashion to the two sheets of material which now comprise the partially finished baby pants. The apparatus 50 at station F may comprise an upper tool 51 which is vertically movable and a lower tool 52 which is relatively fixed.

The tools 51 and 52 are similar, and as may be seen in Fig. 4, lower tool 52 has three rack-like sealing bars 53, each positioned to engage with one of the bands 121, 122 and 124, and each comprising spaced teeth 54. The coaction of the tools 51 and 52 is shown in Fig. 5, wherein the sheets 11 and 12 are shown with the band 124 intermittently sealed thereto.

After the heat sealing operation, upper tool 51 is lifted and the ejector 58, which is similar to ejector 18, is caused to rise upwardly to a suitable aperture in lower tool 52 and to cause the baby pants on the form 100 to move out of the apparatus 50 at station F and to cause it to be moved by the conveyor 25 to the station G.

At station G the final operation in the manufacture of the baby pants is accomplished. This comprises the tearing of the tear seal formed by the line 16' at the leg and waist openings. Where the form 100 has sharpened edges, it is only necessary to pull the two sheets of material against these sharpened edges to thereby open the tear seal. Otherwise, the openings may be provided by any suitable cutting instrument, either manually actuated or automatic in its operation. This operation is illustrated at station G of Fig. 2, and, as has been mentioned, is the final step in the manufacture of the baby pants. Thereafter, it is only necessary to separate the completed baby pants from the form 100, as is shown at station H, suitable receptacles 60 and 61 being provided to receive the forms 100 and pants, respectively.

In the embodiment of the invention shown in Fig. 6, the forms 100 are first fed on a conveyor 25 to an apparatus 70 corresponding to the apparatus 30 shown in Fig. 1. At this station, corresponding to stations A' and B' of Fig. 7, the endless bands 121, 122 and 124 are applied directly onto the leg parts 101 and 102 and the waist part 104 of form 100, respectively. The forms 100, with the three endless bands thereon are then moved by a conveyor 71 to a magazine and dispenser mechanism 72, which receives the forms 100 at the top thereof and holds these forms, with the aforementioned endless bands thereon in stacked array. The dispenser mechanism of the magazine and dispenser 72 removes a form at a time from the bottom of the magazine and inserts it between sheets 11 and 12 drawn from the supply rolls shown to the left of magazine 72. It will be understood that the form 100, when placed between the sheets 11 and 12, is also between an upper die 74 and a lower jig 75, which are configured as shown in Fig. 8.

Referring now to Fig. 8, there is shown in plan view the die 74 which may be seen to comprise a knife edge 76 extending in a continuous manner to define a baby pants pattern. The knife 76 corresponds to the knife or cutting element 16 of Fig. 1, and performs the same office as said element 16. Located at appropriate places to form the side seams and crotch seams are sealing bars 77, each of which is located just within the knife edge 76. At the waist and leg openings, there are provided the rack elements 78, and these will apply an intermittent heat pattern, as will be understood. The lower jig 75 in general conforms to the above described upper die 74, with the exception that there is not provided therein an element corresponding to the knife edge 76.

After the formation of the tear seal in the pattern of a baby pants, the formation of the side and crotch seams and the intermittent sealing of the endless bands to the two sheets of material, simultaneously in the die 74 and jig 75, the die 74 is lifted and the ejector 88 is caused to rise through a suitable opening in the jig 75; ejector 88 may be similar in construction to the ejectors 18 and 58 of Fig. 1, and thus causes the partially completed baby pants to translate to the right where an apparatus 80, similar to the apparatus 20, causes the partially completed baby pants to separate at the station E' in a manner corresponding to the action at the station B of Fig. 1.

Thereafter, it is only necessary to tear the tear seals at the leg and waist openings, as shown at station E' on Fig. 7. The baby pants is then removed from the form 100, as shown at station H' of Fig. 7 and the forms 100 deposited into the bin 60 and the baby pants deposited into the bin 61. It may be desirable to reverse the baby pants following its removal from the form 100, so as to place the endless bands on the exterior of the baby pants, the reversed baby pants being shown at I' in Fig. 7.

Removal of the baby pants from the form 100 in some instances is unnecessary, as when the form 100 is made of a material that is sufficiently economical that it may be shipped with and form a part of the completed baby pants package. Hence, form 100 may comprise a pulp product suitably impregnated with material to impart to it necessary characteristics to cooperate with the electronic heat sealing equipment, such as the die 74 and jig 75. Thus, the form 100 could be suitably printed and as the material 11 and 12 is somewhat transparent, the necessary advertising and other printing will be seen through the finished baby pants.

There have been provided methods for the manufacture of baby pants which are capable of being formed by substantially automatic equipment, and involving a minimum of manual labor. The baby pants formed by these methods are of uniformly high quality, and provide all the advantages of baby pants now in common use. Further, due to the elimination of the more expensive manual operations, the methods of the present invention provide for the more economical manufacture of baby pants.

It will be understood that while these embodiments have been described in accordance with the manufacture of the baby pants, they are not so limited, and many other products may be manufactured by the processes of the present invention, as will be understood.

It will be obvious to those skilled in the art that various changes may be made without departing from the spirit of the invention and therefore the invention is not limited to what is shown in the drawings and described in the specification but only as indicated in the appended claims.

What is claimed is:

1. A method for making baby pants comprising placing a metallic form having two leg parts, two side seam parts, a crotch part and a waist part between two superposed sheets of thermoplastic material, simultaneously tear sealing said sheets about the periphery of said form and heat sealing said sheets inwardly of the thus formed tear seal at the two side seam parts and the crotch part, separating the partially completed baby pants from the residual sheet material, placing stretched endless elastic thermoplastic bands over said form and over the sheets at the leg parts and the waist part, heat sealing intermittent portions of said bands to said sheets, separating said tear seals to provide leg and waist openings, and removing said form from said thus completed baby pants article.

2. A method for making baby pants comprising placing a metallic form having two leg parts, two side seam parts, a crotch part and a waist part between two superposed sheets of thermoplastic material, simultaneously tear sealing said sheets about the periphery of said form and heat sealing said sheets inwardly of the thus formed tear seal at the two side seam parts and the crotch part, separating the partially completed baby pants from the residual sheet material, placing stretched endless elastic thermoplastic bands over said form and over the sheets at the leg parts and the waist part, heat sealing intermittent portions of said bands to said sheets, and separating said tear seals to provide leg and waist openings.

3. A method for making baby pants comprising placing a form having two leg parts, two side seam parts, a crotch part and a waist part between two superposed sheets of thermoplastic material, tear sealing said sheets about the periphery of said form and heat sealing said sheets inwardly of the thus formed tear seal at the two side seam parts and the crotch part, separating the partially completed baby pants from the residual sheet material, placing stretched endless elastic thermoplastic bands over said form and over the sheets at the leg parts and the waist part, heat sealing intermittent portions of said bands to said sheets, and separating said tear seals to provide leg and waist openings.

4. A method for making baby pants comprising placing a form having two leg parts, two side seam parts, a crotch part and a waist part, between two superposed sheets of thermoplastic material, tear sealing said sheets about the periphery of said form and heat sealing said sheets inwardly of the thus formed tear seal at the two side seam parts and the crotch part, separating the partially completed baby pants from the residual sheet material, placing stretched endless elastic thermoplastic bands over said form and over the sheets at the leg parts and the waist part, and heat sealing intermittent portions of said bands to said sheets.

5. A method for making an article comprising placing a suitable form between two superposed sheets of thermoplastic material, tear sealing said sheets about the periphery of said form and heat sealing said sheets inwardly of the thus formed tear seal to form seams, separating the partially completed article from the residual sheet material, placing a stretched endless elastic thermoplastic band over said forms and over the sheets, heat sealing intermittent portions of said band to said sheets, and removing said form from said thus completed baby pants article.

6. A method for making an article comprising placing a suitable form between two superposed sheets of thermoplastic material, tear sealing said sheets about the periphery of said form and heat sealing said sheets inwardly of the thus formed tear seal to form seams, separating the partially completed article from the residual sheet material, placing a stretched endless elastic thermoplastic band over said forms and over the sheets, and heat sealing intermittent portions of said band to said sheets.

7. A method for making an article comprising placing a suitable form between two superposed sheets of thermoplastic material, tear sealing said sheets about the periphery of said form and heat sealing said sheets inwardly of the thus formed tear seal to form seams, separating the partially completed article from the residual sheet material, placing a stretched endless elastic thermoplastic band over said forms and over the sheets, and heat sealing intermittent portions of said bands to at least one of said sheets.

8. A method for making baby pants comprising placing stretched endless elastic thermoplastic bands over the two leg parts and waist part of a metallic form having two leg parts, two side seam parts, a crotch part and a waist part, placing said form with the bands thereon between two superposed sheets of thermoplastic material, simultaneously tear sealing said sheets about the periphery of said form, heat sealing said sheets inwardly of the thus formed tear seal at the two side seam parts and the crotch part and heat sealing intermittent portions of said bands to said sheets, separating the baby pants article from the residual sheet material, separating said tear seals to provide leg and waist openings, and removing said form from said thus completed baby pants.

9. A method for making baby pants comprising placing stretched endless elastic thermoplastic bands over the two leg parts and waist part of a metallic form having two leg parts, two side seam parts, a crotch part and a waist part, placing said form with the bands thereon between two superposed sheets of thermoplastic material, simultaneously tear sealing said sheets about the periphery of said form, heat sealing said sheets inwardly of the thus formed tear seal at the two side seam parts and the crotch part and heat sealing intermittent portions of said bands to said sheets, separating the baby pants article from the residual sheet material, and separating said tear seals to provide leg and waist openings.

10. A method for making baby pants comprising placing stretched endless elastic thermoplastic bands over the two leg parts and waist part of a metallic form having two leg parts, two side seam parts, a crotch part and a waist part, placing said form with the bands thereon between two superposed sheets of thermoplastic material, tear sealing said sheets about the periphery of said form, heat sealing said sheets inwardly of the thus formed tear seal at the two side seam parts and the crotch part and heat sealing intermittent portions of said bands to said sheets, separating the baby pants article from the residual sheet material, and separating said tear seals to provide leg and waist openings.

11. A method for making baby pants comprising placing stretched endless elastic thermoplastic bands over the two leg parts and waist part of a metallic form having two leg parts, two side seam parts, a crotch part and a waist part, placing said form with the bands thereon between two superposed sheets of thermoplastic material, tear sealing said sheets about the periphery of said form, heat sealing said sheets inwardly of the thus formed tear seal at the two side seam parts and the crotch part and heat sealing intermittent portions of said bands to said sheets, and separating the baby pants article from the residual sheet material.

12. A method for making an article comprising placing a stretched endless elastic thermoplastic band on a form, placing said form with the band thereon between two superposed sheets of thermoplastic material, simultaneously tear sealing said sheets about the periphery of said form, heat sealing said sheets inwardly of the thus formed tear seal and heat sealing intermittent portions of said band to said sheets, separating the article from the residual sheet material, separating said tear seals to provide openings, and removing said form from said thus completed article.

13. A method for making an article comprising placing a stretched endless elastic thermoplastic band on a form, placing said form with the band thereon between two superposed sheets of thermoplastic material, tear sealing said sheets about the periphery of said form, heat sealing said sheets inwardly of the thus formed tear seal and heat sealing intermittent portions of said band to said sheets, separating the article from the residual sheet material, separating said tear seals to provide openings, and removing said form from said thus completed article.

14. A method for making an article comprising placing a stretched endless elastic thermoplastic band on a form, placing said form with the band thereon between two superposed sheets of thermoplastic material, tear sealing said sheets about the periphery of said form, heat sealing said sheets inwardly of the thus formed tear seal and heat sealing intermittent portions of said band to said sheets, separating the baby pants article from the residual sheet material, and separating said tear seals to provide openings.

15. A method for making an article comprising placing a stretched endless elastic thermoplastic band on a form, placing said form with the band thereon between two superposed sheets of thermoplastic material, tear sealing said sheets about the periphery of said form, heat sealing said sheets inwardly of the thus formed tear seal and heat sealing intermittent portions of said band to said sheets, and separating the article from the residual sheet material.

16. A method for making an article comprising placing a stretched endless elastic thermoplastic band on a form, placing said form with the band thereon between two superposed sheets of thermoplastic material, tear sealing said sheets about the periphery of said form, heat sealing said sheets inwardly of the thus formed tear seal and heat sealing intermittent portions of said band to at least one of said sheets, and separating the article from the residual sheet material.

References Cited in the file of this patent

UNITED STATES PATENTS

| | | |
|---|---|---|
| 2,235,981 | Coe | Mar. 25, 1941 |
| 2,905,581 | Maxey | Sept. 22, 1959 |